Dec. 9, 1941.   J. H. CLEWELL ET AL   2,265,226
CAST RESINS HAVING INTEGRAL SHEEN
Filed Oct. 17, 1936
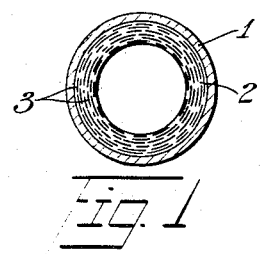
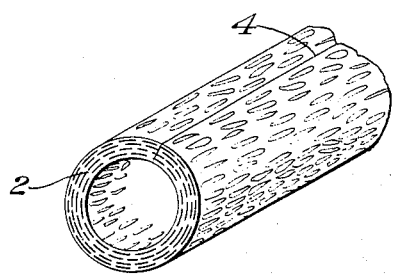
John H. Clewell  INVENTORS
Reuben T. Fields
BY
ATTORNEY.

Patented Dec. 9, 1941

2,265,226

UNITED STATES PATENT OFFICE 2,265,226

CAST RESINS HAVING INTEGRAL SHEEN

John H. Clewell and Reuben T. Fields, Arlington, N. J., assignors to E. I. du Pont de Nemours & Company, Wilmington, Del., a corporation of Delaware Application October 17, 1936, Serial No. 106,253

10 Claims. (Cl. 18—58)

This invention relates to cast synthetic resins having integral sheen and to the process of preparing same and, more particularly, to the preparation of tubes having integral sheen.

For the sake of simplicity the term "integral sheen" will be used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation, within the material, of lamellae (flat plates, crystals, and the like) of substances capable of reflecting light. As regards appearance, the term thus includes the various types of sheen and character of sheen commonly designated, in the plastics industry, by the terms pearly, nacreous, silky, metallic, chatoyant, etc.

Various substances, characterized in common by their occurrence in the form of light-reflecting lamellae, have been widely used for the purpose of imparting integral sheen to various transparent or substantially transparent materials such as cellulose ester and resin plastics. Such substances, including the so-called pearl essence obtained from fish scales, various inorganic and organic substitutes therefor, and metal bronzing powders, are well known to the art, as are also various methods whereby their lamellae may be brought into systematic orientation so as to yield certain desired visual effects. It is well recognized that to obtain a sheen effect the light-reflecting lamellae must be positioned or oriented so that a large percentage of them lie with their broad faces parallel to each other and substantially parallel to the surface of the plastic which is to have the appearance of sheen.

Heretofore, no method has been known by which synthetic resin tubing could be made with a uniform integral sheen over its entire peripheral surface nor with a uniform orientation of the light-reflecting lamellae concentric with the periphery throughout the thickness of the tubing, such orientation being hereafter referred to as "concentric orientation." To be more specific, the term "concentric orientation" is used throughout the specification and the claims to denote a systematic orientation of lamellae in a plastic tube wherein the lamellae are positioned with their broad faces substantially parallel to the peripheral surface of the tube, that is, when each lamella, throughout the entire thickness of the wall of the tube presents its two broad faces substantially at a right angle with the radius from the center of the tube. Likewise, sheet stock, with the possible exception of cast film which is necessarily greatly limited in its thickness, has never been made heretofore with a uniform unbroken sheen over its entire surface.

An object of the present invention is to provide a method of preparing synthetic resin tubing with a uniform integral sheen over its entire surface and having a concentric orientation of light-reflecting lamellae throughout. A further object is to prepare such tubing of appreciable lengths in untapered form. A still further object is to provide a practical method of producing tubing as above free of dirt and contamination and of great purity of color. Other objects will be apparent from the description of the invention given hereinafter.

The above objects are accomplished according to the present invention by partially filling a cylindrical mold with a polymerizable liquid organic compound containing light-reflecting lamellae and rapidly rotating said mold about its major axis while subjecting the liquid to polymerizing conditions until the organic compound is converted to a solid. The cast synthetic resin tube thus formed may be readily removed from the cylindrical mold after cooling, hence obviating the necessity of using a tapered mold.

In copending application Serial Number 106,251, entitled "Cast resins and preparation of same," filed October 17, 1936, applicant, Reuben T. Fields, assigned to the assignee of the present application, is fully disclosed the method of forming untapered cast synthetic resin tubing by rapidly rotating about its major axis a cylindrical mold partially filled with a polymerizable liquid organic compound and the manufacture of a sheet from the tube thus formed. Basically this is accomplished by sealing a cylindrical mold at both ends after the introduction of the polymerizable liquid organic compound and mounting the sealed mold between two shafts, one of which is driven to give the necessary rotary motion to the mold. Preferably, the mold is rotated in horizontal position inside a housing and a spray of water or other liquid is played on the rotating mold at a temperature sufficient to induce polymerization at a fair speed but not sufficient to allow the exothermic heat of the polymerization reaction reach, at any point within the mass, a temperature that would tend to cause the formation of bubbles. Instead of using a spray of liquid to impart heat to the mold, the mold may be rotated in a warm air bath.

It has now been discovered that, if light-reflecting lamellae are mixed with the polymerizable liquid organic compound and polymerization carried out while the cylindrical mold holding the liquid is being rotated about its major axis with sufficient speed so that the centrifugal force is great enough to distribute the polymerizing mass in a uniform layer inside the mold, the resulting tube contains the light-reflecting lamellae substantially perfectly orientated throughout the tube concentric with the periphery of the tube. The appearance of the tube is entirely unique in that it possesses a uniform integral sheen over all its peripheral surface and retains that sheen even when the tube is machined down to give any desired wall thickness thus indicating that the orientation of the particles is concentric with the periphery of the tube throughout.

In the accompanying drawing forming a part of the present application:

Fig. 1 is a cross section through a cylindrical mold showing a synthetic resin tube enclosed therein;

Fig. 2 is a perspective view of the tube shown in Fig. 1 after its removal from the mold.

In the several figures of the drawing cross-hatching of the sections of synthetic resin has been omitted for the sake of clarity and the light-reflected lamellae contained in the resin are shown in exaggeratedly large size and small number to show the orientation definitely. Light-reflecting lamellae at right angles to the line of sight are illustrated by circles or ovals and those viewed edge-on by short lines.

In the following examples given to illustrate the invention, reference is made to the several figures of the drawing. Parts are given by weight throughout where not otherwise indicated.

*Example 1.*—A piece of seamless drawn aluminum tubing of 3⅛" inside diameter and 24" in length and having liquid-tight end caps, is used as a cylindrical mold. This mold is loaded with 35 ounces of a syrup formed by effecting a partial polymerization of monomeric methyl alpha methacrylate and containing one per cent by weight of Paispearl paste, a commercial preparation of fish scale essence, previously thinned by admixture with four times its weight of butyl acetate. It contains also 0.005 per cent of benzoyl peroxide as catalyst. It is of about the viscosity of maple syrup.

The mold is then mounted between two shafts adapted to hold it horizontally and rotate it about its major axis in a housing adapted to be heated so that the cylindrical mold is, in effect, rotated in an air bath. While the temperature in the housing is maintained at about 68° C., the mold is rotated at 160 R. P. M. for 16 hours. As indicated in Fig. 1, during this period of rotation the initial liquid material is maintained constantly in a layer 2 of uniform thickness around the cylindrical wall 1 of the mold and gradually polymerizes to a hard synthetic resin mass. During this period the layer 2 maintains at all times its geometrical uniformity of thickness and geometrically smooth and regular free surface.

The rotation of the mass of polymerizable liquid effects an orientation of the light-reflecting lamellae 3, 3 in regular unbroken layers concentric with the cylindrical wall 1 of the cavity of the mold and hence with the inner and outer cylindrical surfaces of the rotating mass of polymerizable liquid, and as the latter polymerizes the lamellae are fixed permanently in position in these concentric layers.

Upon the completion of the reaction of polymerization, the mold and contents are cooled, and the resin is readily slipped out of the mold in the form of an untapered tube (see Fig. 2) having the full length of the mold, less about ¼", an outside diameter of approximately 3⅛" and a wall thickness of approximately ¼".

The wall thickness is uniform and the interior free surface smooth. The exterior surface substantially duplicates the interior surface of the mold. The fish scale essence is found to be in substantially complete and uniform concentric orientation throughout the thickness of the tube. The interior surface hence exhibits immediately a substantially uniform sheen. The slight roughness of the exterior surface results in a slight irregularity of orientation which is, however, only superficial, and upon the smoothing of this surface by very shallow grinding and polishing it reveals a substantially uniform peripheral sheen, as does also any intermediate surface, concentric therewith, which may be exposed by machining.

In the following example the tubing is built up in layers, a procedure which is preferred where a wall thickness in excess of 0.5" is desired. This example also illustrates the expedient of making the tubing with an outside layer having an integral sheen and a plain, transparent interlayer.

*Example 2.*—The equipment is the same as in Example 1 except that the mold is mounted to rotate within a spray of water maintained at 70° C.

A tube duplicating that of Example 1 is produced within the mold by the procedure of that example. It is not removed from the mold. There is then added another portion of 28 oz. of syrup, the same except for the omission of the fish scale essence. This increment is then polymerized by a further heating period of 12 hours, the mold being rotated as before.

The tube, removed as in Example 1, is made up of an outer pearly layer, of thickness about ¼", and an inner transparent layer, of thickness about ¼".

The Examples 3 to 12, inclusive, given below illustrates compositions comprising polymerizable liquids, sheen producing substances and various auxiliary ingredients, which compositions are adapted for use in the present invention.

*Example 3*

| | Parts |
|---|---|
| Methyl methacrylate syrup containing 10% dibutyl phthalate | 1000 |
| Paispearl paste | 8.5 |
| Thinned with | |
| Butyl acetate | 48 |
| Solution of benzoyl peroxide, 3.0% in methyl methacrylate monomer | 8 |

*Example 4*

| | Parts |
|---|---|
| Lead carbonate "pearl" | 4 |
| In pyroxylin dope (10%) | 23 |
| Acetone | 27 |
| Methyl methacrylate syrup containing 10% dibutyl phthalate | 1000 |
| Benzoyl peroxide | 0.25 |

*Example 5*

| | Parts |
|---|---|
| Methyl methacrylate syrup | 1000 |
| Acetaldehyde | 9.5 |
| Special research lining bronze (aluminum bronze) | 1.1 |

This gives a very dark gray pearl.

Example 6

Same as Example 6, but with half as much bronze.

This gives a gray pearl.

Example 7

Same as Example 6, but instead of the aluminum bronze there is used

| | Parts |
|---|---|
| Fine pale gold bronze | 2.2 |

This gives a golden pearl or metallic sheen.

Example 8

| | Parts |
|---|---|
| Methyl methacrylate syrup containing 10% dibutyl phthalate | 1000 |
| Special research lining bronze | 0.6 |
| Rolled dough containing polymethyl methacrylate, 49 parts; diamyl phthalate, 47.7 parts; copper phthalyl cyanine blue, 3.3 parts | 2 |
| Solution of Celanthrene Fast Yellow GL, 4 grams per liter, in monomeric methyl alpha methacrylate | 95 |
| Acetaldehyde | 10 |

This gives a green pearl.

Example 9

| | Parts |
|---|---|
| Methyl methacrylate syrup | 1000 |
| Paispearl paste | 3.5 |
| Acetaldehyde | 10 |
| Solution of Celanthrene Fast Yellow GL, 4 grams per liter, in monomeric methyl methacrylate | 95 |

This gives a light yellow pearl.

Example 10

| | Parts |
|---|---|
| Styrene, partially polymerized to a syrup | 1000 |
| Benzoyl peroxide | 0.5 |
| Special research lining bronze | 0.4 |

Example 11

| | Parts |
|---|---|
| Vinyl acetate syrup | 1000 |
| Benzoyl peroxide | 0.5 |
| Fine pale gold bronze | 2 |

Example 12

| | Parts |
|---|---|
| Styrene syrup | 1000 |
| Paispearl paste | 6 |
| Thinned with | |
| Dibutyl phthalate | 50 |
| Benzoyl peroxide | 0.5 |

It will be understood that the above examples are merely illustrative and that the present invention broadly comprises the production of a tubing having a uniform integral sheen over its entire peripheral surface by partially filling an elongated mold having a mold cavity of generally circular cross-section, with a polymerizable liquid organic compound containing light-reflecting lamellae and rapidly rotating the mold about its major axis while subjecting the compound to polymerizing conditions, until it is converted into a solid tube.

The invention is applicable broadly to any polymerizable liquid compound adapted to be converted into a solid. The invention is particularly valuable for use with such compounds which undergo material shrinkage in the conversion from liquid to solid. Among the unsaturated liquid organic compounds capable of polymerizing by the action of heat, with or without catalyst, are the esters of the alkacrylic acids, such as the alkyl esters of methacrylic acid and of ethacrylic acid, including ethyl methacrylate, methyl ethacrylate, ethyl ethacrylate, glycol dimethacrylate, butyl methacrylate, ethoxyethyl methacrylate, and the nitriles, amides and substituted alkyl and aryl amides of alkacrylic acids; vinyl esters, including vinyl butyrate, vinyl acetate and (in liquid form reached by a partial polymerization) vinyl chloride; styrene and alpha methyl styrene; dimethyl itaconate.

Obviously, the invention is of limited use with organic compounds whose polymers are so soft that tubes formed therefrom will not retain their shape under ordinary conditions although for certain purposes such soft tubing is useful.

In handling the suitable resin-forming substances, all of which except vinyl chloride are available in monomeric liquid form, it will usually be optional whether the strictly monomeric substance or mixture of substances be used or whether, instead, the monomeric material be partially polymerized, up to the condition of a flowable syrup, before being placed in the mold. The latter is, however, ordinarily to be preferred, since the time required in the mold will be less than for the monomeric material. And it is particularly to be preferred when a mineral pigment is used in the batch, since pigments tend to separate out from a mobile monomeric liquid.

The invention is applicable also to materials of the type of phenol-formaldehyde and urea-formaldehyde condensation products in the stage of manufacture at which they are customarily poured into molds, namely after the recognized step of dehydration, which leaves the material in the form of a viscous syrup capable of being polymerized by the application of heat. Since these condensation products undergo comparatively little shrinkage during polymerization and are not subject to volatilization, a limitation of the thickness of layer cast is not required. In using compositions of this type, and particularly with phenol-formaldehyde, the choice of light-reflecting lamellae is comparatively limited because some of the otherwise desirable light-reflecting lamellae are subject to interaction with the resin-forming syrups. Certain copper-aluminum alloys are satisfactory as the light-reflecting lamellae with phenol-formaldehyde.

Those skilled in the art will understand that for different polymerizable organic compounds the optimum temperature range at which polymerization will be carried out, will not be the same and even for a given organic compound it is subject to variation due to presence of catalyst, inhibitors, and accidental impurities. Ordinarily the optimum temperature will be established by trial. It has been found that for methyl methacrylate the external heating medium is usually best maintained at 65–75° C.

The time required for polymerization will vary according to conditions understood in the art. Likewise, the selection and amount of polymerization catalysts used, if any, will be governed by the usual considerations to provide a controlled catalytic action free from harmful effects in the form of bubbling, haze and discoloration.

Usually it is most practical to employ heat as the polymerizing influence assisted by a catalyst if desired, but a suitable source of light may be utilized to promote polymerization provided the mold be made of material such as glass or quartz which is at least partially transparent to the active light rays.

Various dyestuffs, pigments, plasticizers and other modifiers may be incorporated with the polymerizable organic compounds to obtain certain desired characteristics in the finished product, according to well known practices in the art.

The invention permits of the manufacture of tubing of a great variety of sizes, without change in the principle of operation, from that of small diameter, suitable e. g. for fountain pen and pencil parts, up to that of a diameter of several feet. In some cases the diameter may be greater than the length. Walls of various thicknesses may be made, those of more than about 0.5" being preferably built up in layers by successive increments of material as in Example 2.

Since the method provides for making an untapered tube which is removable from the mold with no difficulty, no limitation is imposed upon the length of the mold.

The invention is directed primarily to the spinning of a cylindrical mold about its axis in horizontal position. By this means is gotten a tube of uniform wall thickness. Spinning of a cylindrical mold about a vertical axis falls within the scope of the invention, but does not yield directly a tube of uniform wall thickness, since the inner surface of the liquid, and hence of the resulting tube, is not that of a cylinder, but rather that of a paraboloid of revolution. Operation about a vertical axis also necessitates the use of higher rotational speeds.

It has been found that drawn seamless aluminum tubing is excellently adapted to serve as the mold in the present process although other materials may be used. The material of which the mold is made should be chemically inert toward the liquid being polymerized and must be sufficiently rigid so that it will not sag between the supporting shafts although an intermediate support may be provided if necessary for molds of unusual length.

The invention is not dependent on specific mechanical means. It requires merely that the tube mold be suitably sealed and properly mounted and that it be rotated smoothly during the polymerization at a speed sufficient to maintain the liquid undergoing polymerization in a uniform layer around the entire periphery of the wall of the mold, and that the heating be distributed so that the rate of polymerization at all points along the length of the mold shall be maintained uniform. A further requirement is that the application of temperature, and its control, shall be such as to prevent the possibility of general or local overheating within the mass of polymerizing material, so that the resulting tube shall be free from flaws and bubbles.

Various light reflecting lamellae well known in the art are adapted for use in the present invention. Among these may be mentioned fish scale essence, mercurous chloride, aluminum bronze, "gold" bronze, lead carbonate in the form of light reflecting lamellae, and lead iodide in the form of light reflecting lamellae.

Ordinarily a mold having a cavity circular in cross-section will be used but the invention is also applicable with molds having cavities of modified cross-sections as hexagonal and octagonal cross-sections which approach being circular but are not actually circular.

The speed of rotation of the mold should be above the minimum which will cause uniform distribution of the polymerizable liquid upon the rotating inner surface of the mold. As a practical matter, speeds outside of the range of 120–1500 R. P. M. would seldom be used. Within this range it has been found that the lower speeds tend to give a tube in which the concentric orientation of the light reflecting lamellae more nearly approaches perfection; that is, at speeds in the general range of 120–200 R. P. M., the integral sheen is characterized by a unique smoothness indicating practically perfect concentric orientation, while at appreciably higher speeds there may be a very slight roughness in the appearance of the integral sheen which would seem to indicate that the concentric orientation is not quite as perfect.

The present invention in one form is also adapted to produce tubing having an integral sheen of an irregular character and highly attractive in appearance. This is accomplished by making two or more batches of a polymerizable resin-forming organic compound of different viscosities, one of which is readily flowable and contains light reflecting lamellae, the other or others being of higher viscosity and containing light reflecting lamellae or not, as desired. The two or more batches of resin-forming material are intermingled and loaded into the mold and, thereafter, processed as disclosed herein. The effect of introducing the higher viscosity material is to interrupt or distort the concentric orientation of the lamellae in the low viscosity material by interposing, in the line of orienting flow within the low viscosity material, obstacles in the form of discrete masses of material of high viscosity.

It will be understood that the higher viscosity resin-forming material is not limited to a flowable liquid but includes material of which the viscosity has been still further raised, i. e., material in the form of a gel or even a solid. To obtain the characteristic effect produced by this form of the invention, the polymerizable resin-forming liquid introduced into the mold must be composed of at least two intermingled portions having distinctly different viscosities. If the viscosity of the two portions was not appreciably different, a more or less uniform blending of the two would result and the optical effects here described would not be obtained.

The optical effect obtained through the use of a mixture of different viscosity polymerizable resin-forming materials in the present invention is an irregular sheen as distinguished from the smooth, uniform sheen obtained otherwise. Where the higher viscosity material is a liquid, an integral sheen characterized by a unique undulating effect is obtained. If fragments of solid polymer are used as the higher viscosity material, an integral sheen of more broken and irregular character is obtained. Intermediate effects are obtained where the higher viscosity material is an extremely viscous liquid or a gel. In each instance, the lamellae in the lower viscosity material tend to become concentrically oriented and do become so oriented to an appreciable extent where the higher viscosity material has not interfered, so that novel optical effects heretofore unknown are obtained.

The higher viscosity resin-forming material may also contain light reflecting lamellae; in the case of a solid, the orientation of the lamellae is fixed and will not be altered due to the rotation of the mold. With viscous liquids, the lamellae may be sufficiently influenced by the rotary motion of the mold to become more or less concentrically oriented, or they may persist in the orientation which they assume when introduced into the mold, the viscosity of the liquid and speed of rotation of the mold being influencing factors.

In using a mixture of intermingled resin-forming substances of different viscosity, particularly where all components are liquids, it is preferred to rotate the mold at a somewhat higher speed than where the material is of one viscosity, the preferred range being 500—1000 R. P. M. Obviously, speeds outside of this range may be used and will be used to obtain integral sheens of specific characteristics. Where solid pieces of polymer are used with a low viscosity liquid containing light reflecting lamellae, the higher speeds of rotation of the mold are not of so much significance.

The present invention provides means of preparing cast synthetic resins in the form of tubing characterized by having an unbroken uniform brilliant integral sheen visible over their entire major surfaces and on surfaces parallel thereto, which may be exposed by machining. It also provides means of preparing tubing of undulating and broken integral sheen of great brilliance and attractiveness. It thus furnishes means of making shaped and fabricated articles of unique and beautiful appearance. The transparency and freedom from color of resins available for use with this invention, and the availability of the corresponding monomeric liquids in clean and uncontaminated form, enhance the brilliance and purity of color of the cast products so prepared so that they are notably superior in appearance to plastics of integral sheen prepared from materials in which feasible means of orientation have heretofore been known.

As many apparently widely different embodiments of this invention may be made without departing from the spirit and scope thereof, it is to be understood that the invention is not limited to the specific embodiments thereof except as defined in the appended claims.

We claim:

1. A cast tube of a polymerized organic compound containing light reflecting lamellae distributed therethrough, said lamellae being oriented concentrically with respect to the major axis of said tube.

2. A cast tube of polymerized methyl methacrylate containing light reflecting lamellae substantially uniformly distributed therethrough, said lamellae throughout the tube being oriented concentrically with respect to the major axis of said tube.

3. Process of concentrically orienting light reflecting lamellae in tubes with respect to their major axes wherein said tubes are formed by polymerizing a polymerizable liquid organic compound adapted to give a polymer solid at ordinary temperatures, which comprises mixing and suspending light reflecting lamellae in said organic compound, partially filling an elongated mold with the resulting mixture, and rapidly rotating said mold about its major axis while subjecting said organic compound to polymerizing conditions at a temperature substantially below the temperature of bubble formation until said organic compound is converted to a solid.

4. Process of concentrically orienting light reflecting lamellae in tubes with respect to their major axes wherein said tubes are formed by polymerizing a polymerizable liquid organic compound adapted to give a polymer solid at ordinary temperatures, which comprises mixing and suspending light reflecting lamellae in said organic compound, partially filling a cylindrical mold with the resulting mixture, and rapidly rotating said mold about its major axis in horizontal position while subjecting said organic compound to polymerizing conditions at a temperature substantially below the temperature of bubble formation until said organic compound is converted to a solid.

5. Process of concentrically orienting light reflecting lamellae in tubes with respect to their major axes wherein said tubes are formed by polymerizing a polymerizable liquid organic compound adapted to give a polymer solid at ordinary temperatures, which comprises mixing and suspending light reflecting lamellae in said organic compound, partially filling a cylindrical mold with the resulting mixture, rotating said mold about its major axis in horizontal position at above 120 R. P. M. while maintaining said organic compound at an elevated temperature sufficient to cause polymerization but substantially below the temperature of bubble formation until said organic compound is converted to a solid, cooling said mold and its contents, and sliding the tube thus formed from said mold.

6. Process of concentrically orienting light reflecting lamellae in tubes with respect to their major axes wherein said tubes are formed by polymerizing liquid methyl methacrylate, which comprises mixing and suspending light reflecting lamellae in said liquid methyl methacrylate, partially filling an elongated mold with the resulting mixture, and rapidly rotating said mold about its major axis while subjecting said methyl methacrylate to polymerizing conditions at a temperature substantially below the temperature of bubble formation until said methyl methacrylate is converted to a solid.

7. Process of concentrically orienting light reflecting lamellae in tubes with respect to their major axes wherein said tubes are formed by polymerizing liquid methyl methacrylate, which comprises mixing and suspending light reflecting lamellae in said liquid methyl methacrylate, partially filling a cylindrical mold with the resulting mixture, and rapidly rotating said mold about its major axis in horizontal position while subjecting said methyl methacrylate to polymerizing conditions at a temperature substantially below the temperature of bubble formation until said methyl methacrylate is converted into a solid.

8. Process of concentrically orienting light reflecting lamellae in tubes with respect to their major axes wherein said tubes are formed by polymerizing liquid methyl methacrylate, which comprises mixing and suspending light reflecting lamellae in said liquid methyl methacrylate, partially filling a cylindrical mold with the resulting mixture, rotating said mold about its major axis in a horizontal position at above 120 R. P. M. while maintaining said methyl methacrylate at an elevated temperature sufficient to cause polymerization but substantially below the temperature of bubble formation, until said methyl methacrylate is converted into a solid, cooling said mold and its contents, and sliding the tube thus formed from said mold.

9. Process of concentrically orienting light reflecting lamellae in tubes with respect to their major axes wherein said tubes are formed by polymerizing a polymerizable liquid organic compound adapted to give a polymer solid at ordinary temperatures, which comprises partially filling an elongated mold with said liquid organic compound, said liquid organic compound being composed of at least two intermingled portions having distinctly different viscosities, the portion having the lower viscosity containing light reflecting lamellae suspended therein, and rapidly rotating said mold about its major axis while subjecting said polymerizable liquid organic compound to polymerizing conditions at a temperature substantially below the temperature of bubble formation until said liquid is converted to a solid.

10. Process of concentrically orienting light reflecting lamellae in tubes with respect to their major axes wherein said tubes are formed by polymerizing a polymerizable liquid compound adapted to give a polymer solid at ordinary temperatures, which comprises partially filling an elongated mold with said liquid organic compound, said liquid organic compound being composed of at least two intermingled portions having distinctly different viscosities, the portion having the lower viscosity containing light reflecting lamellae suspended therein, rotating said mold about its major axis in a horizontal position at above 120 R. P. M. while maintaining said liquid organic compound at an elevated temperature sufficient to cause polymerization but substantially below the temperature of bubble formation, until said liquid organic compound is converted into a solid, cooling said mold and its contents, and sliding the tube thus formed from said mold.

JOHN H. CLEWELL.
REUBEN T. FIELDS.

CERTIFICATE OF CORRECTION.

Patent No. 2,265,226. December 9, 1941.

JOHN H. CLEWELL, ET AL.

It is hereby certified that error appears in the printed specification of the above numbered patent requiring correction as follows: Page 3, first column, lines 2 and 7, for "Example 6" read --Example 5--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.